Figure 1:
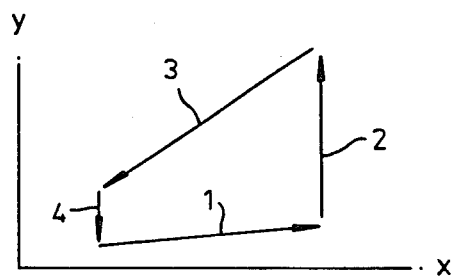

United States Patent [19]

Arvola et al.

[11] Patent Number: 4,756,158
[45] Date of Patent: Jul. 12, 1988

[54] METHOD AND EQUIPMENT FOR CONVERTING THERMAL ENERGY TO MECHANICAL ENERGY

[76] Inventors: Ilkka Arvola, Taavilantie 2; Jaakko Kajamaa, Maununnevantie 38 A, both of 02180 Espoo, Finland

[21] Appl. No.: 705,429
[22] PCT Filed: May 30, 1984
[86] PCT No.: PCT/FI84/00043
 § 371 Date: Jan. 22, 1985
 § 102(e) Date: Jan. 22, 1985
[87] PCT Pub. No.: WO84/04947
 PCT Pub. Date: Dec. 20, 1984

[30] Foreign Application Priority Data

Jun. 3, 1983 [FI] Finland ................................ 832016
Dec. 2, 1983 [FI] Finland ................................ 834438

[51] Int. Cl.$^4$ ................................................ F03G 7/06
[52] U.S. Cl. ........................................ 60/527; 60/529
[58] Field of Search ............. 60/527, 529, 676, 641.1, 60/641.7; 440/113

[56] References Cited

U.S. PATENT DOCUMENTS 4,086,769 5/1978 Smith .................................... 60/527
4,150,544 4/1979 Pachter ................................ 60/527
4,175,390 11/1979 Koslow ................................ 60/527
4,246,754 1/1981 Wayman ............................. 60/527
4,275,561 6/1981 Wang ................................. 60/527

FOREIGN PATENT DOCUMENTS 1476719 3/1969 Fed. Rep. of Germany .
2756093 6/1979 Fed. Rep. of Germany .
2933199 3/1981 Fed. Rep. of Germany ........ 60/527
2502253 9/1982 France .
2072756 10/1981 United Kingdom .
1134778 1/1985 U.S.S.R. .

Primary Examiner—Stephen F. Husar
Attorney, Agent, or Firm—Burns, Doane, Swecker & Mathis

[57] ABSTRACT

Method and equipment for converting thermal energy to mechanical energy by means of a thermal power machine (1). A member of metal alloy contained in the thermal power machine is heated to a certain temperature, whereat its physical properties are changed. This physical change is used as the mechanical drive power of the thermal power machine. The metal alloy member of the thermal power machine (1) is heated by means of heat which is transferred by means of one or several heat pumps (6) from an external medium (9) that contains heat. The heat pump is operated by means of part of the mechanical energy generated by the thermal power machine (1), and the rest of this mechanical energy is used for other purposes, for example for moving a vessel (8).

3 Claims, 5 Drawing Sheets

Fig. 4.
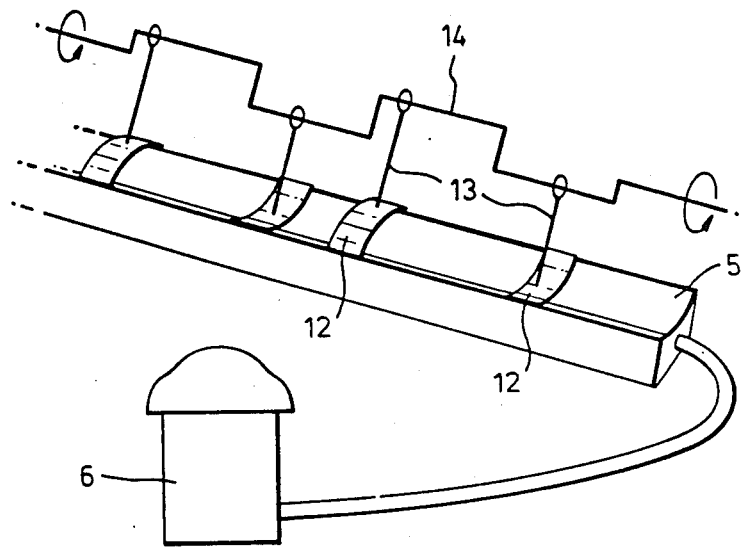
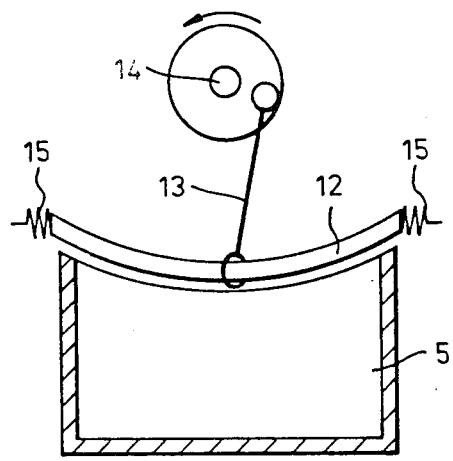
Fig. 5.

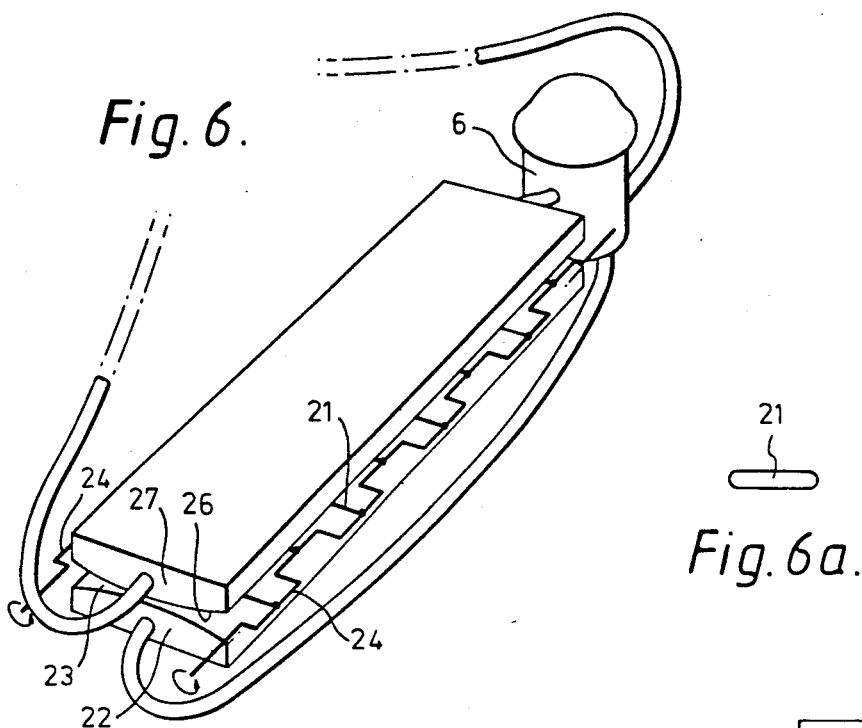
Fig. 6.
Fig. 6a.
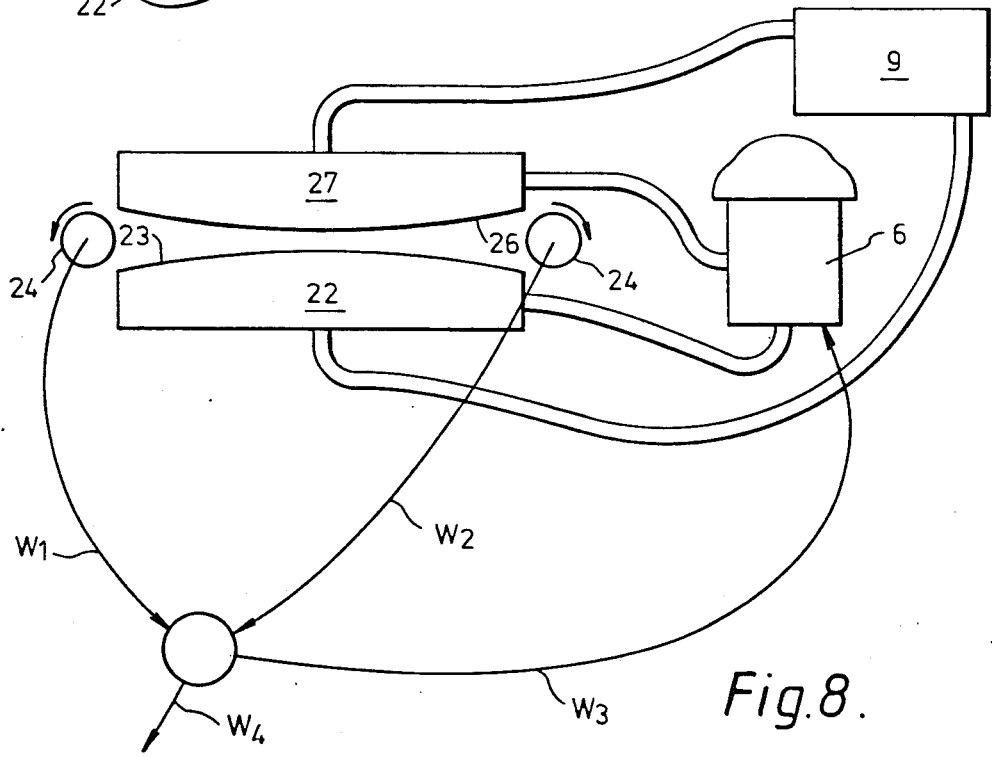
Fig. 8.

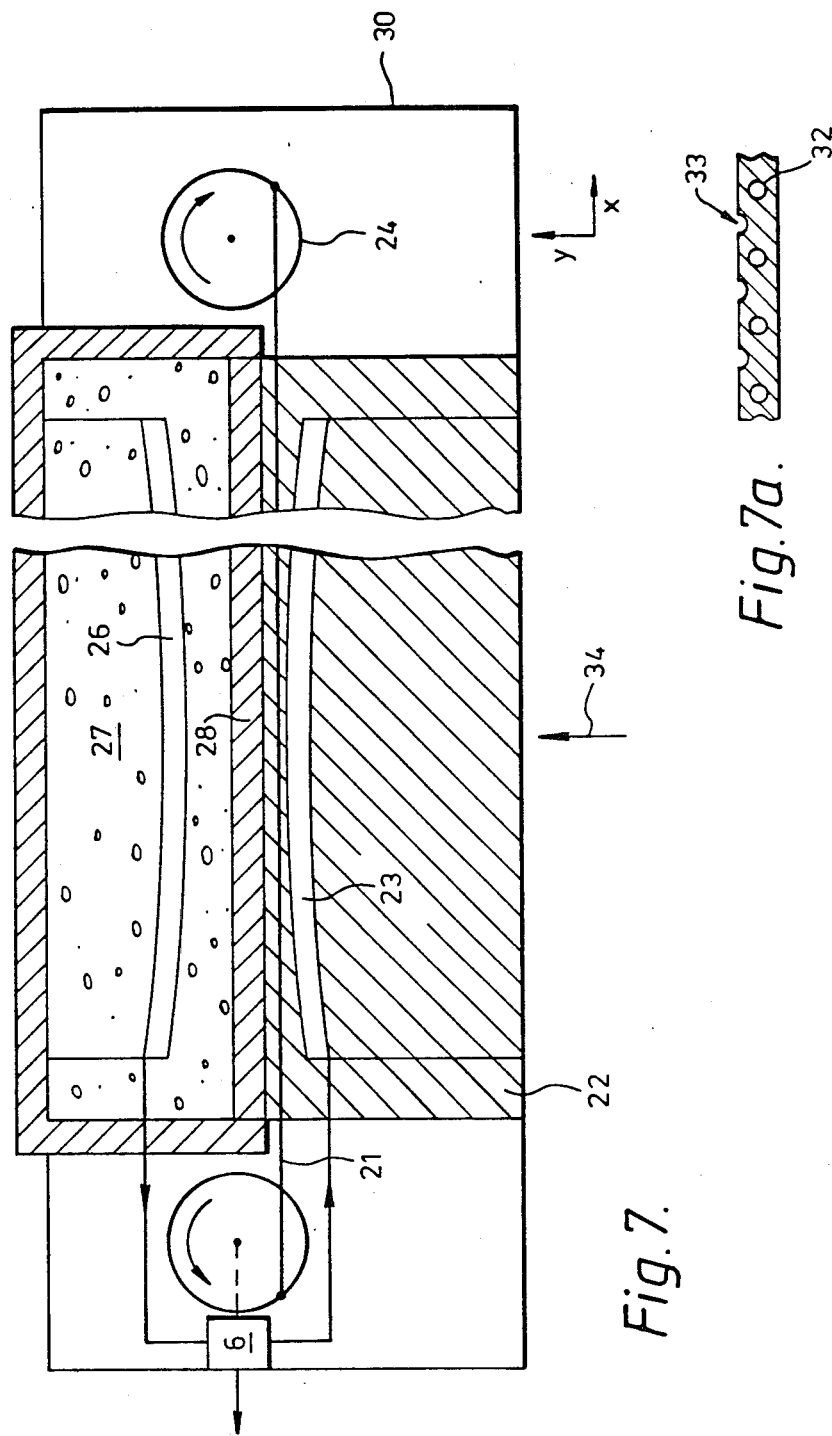

METHOD AND EQUIPMENT FOR CONVERTING THERMAL ENERGY TO MECHANICAL ENERGY

The present invention is concerned with a method for converting thermal energy to mechanical energy by means of a thermal power machine, wherein a member of metal alloy contained in it is heated to a certain temperature, whereat its physical properties, in particular its elastic constant, are changed and this physical change is used as the drive power of the thermal power machine. The invention is also concerned with equipment for converting thermal energy to mechanical energy, the said equipment comprising a thermal power machine which includes one or several metal alloy members, which change their physical properties, in particular their elastic constant, at a certain temperature, whereat this physical change provides the thermal power machine with drive power.

Several metal alloys are known in which the so-called memory phenomenon occurs. The patent claims refer to all of these so-called "memory alloys". One of such "memory alloys" is an alloy of titanium and nickel, known by the name Nitinol. After an object of such a material has been brought to a certain shape by means of an appropriate heat treatment, it always tends to return to this shape when it is heated to its transition temperature. On the contrary, below its transition temperature, the material is readily deformable. Thereat, the material can be deformed by means of a substantially lower force as compared with the force that is generated by it at a higher temperature when it returns to its heat-treated shape. The transition temperature can be adjusted by varying the composition of the alloy, and it may vary within the range of about $-90°$ C. to $150°$ C., most commonly about $40°$ to $90°$ C.

Different applications of thermal power machines are known that are based on the ability of Nitinol to convert thermal energy to mechanical energy. One thermal power machine of this sort is described in the U.S. Pat. No. 4,275,561 (Finnish Patent Application No. 79-2398). The apparatus described therein is based on the tendency of a Nitinol loop to become straight at a temperature of, e.g., about $50°$ C. When such a loop has been fitted around two wheels placed side by side and when one of the wheels is heated, e.g., by keeping it in warm water, the Nitinol loop tends to be straightened and to move at this wheel, making the wheel revolve by means of friction. The power can be taken out of the apparatus from the shaft of the unheated wheel. Such an apparatus has proved highly reliable and durable in operation.

Thermal power machines have also been developed that are based on easy extensibility of a Nitinol wire below the transition temperature and on the force generated by its shrinkage at the said temperature. Such a reversible elongation in the case of Nitinol is about 6 per cent. The power required for extending is considerably lower than the force generated by the shrinkage. Applications in which the shrinkage force is used for rotating a crankshaft, which again extends Nit elements, have been described in the U.S. Pat. Nos. 3,937,019 and 4,086,769.

The object of the present invention is to provide further applications for the conversion of thermal energy to mechanical energy by means of a memory alloy. The method in accordance with the invention is characterized in that the metal alloy member of a thermal power machine is heated by means of heat which is transferred by means of one or several heat pumps from an external medium that contains heat and that the heat pump is operated by means of part of the mechanical energy generated by the thermal power machine and the rest of this mechanical energy is used for other purposes. The equipment in accordance with the invention is characterized in that a heat pump is connected for heating the metal alloy member or members of the thermal power machine and that the output power of the thermal power machine has been connected so as to operate the heat pump.

According to the invention, the internal energy of the metal alloy can be converted to mechanical energy with maximum efficiency by using the heat energy supply of an external medium as the primary source of energy. In such a case, the machine can be applied, e.g., as a motor for a boat or for a ground vehicle, which is independent from conventional distribution and supply of energy as the required energy is obtained from the heat content of the medium surrounding the heat pump. The machine is completely free from pollution, because no combustion waste is produced in the form of solid particles or gases, nor does it produce noise.

Figure 2:
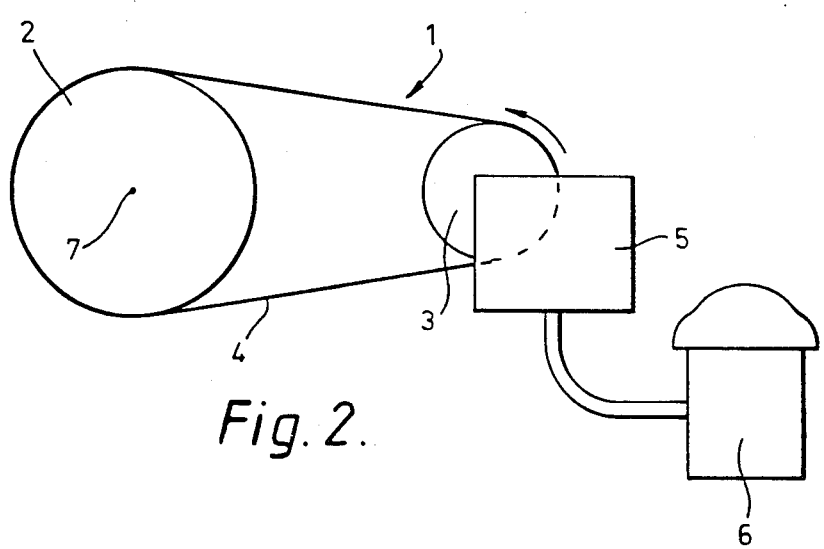
Figure 3:
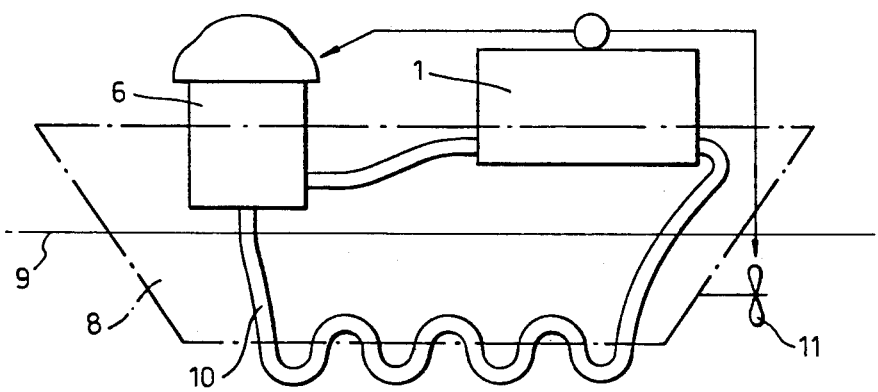
Figure 9:
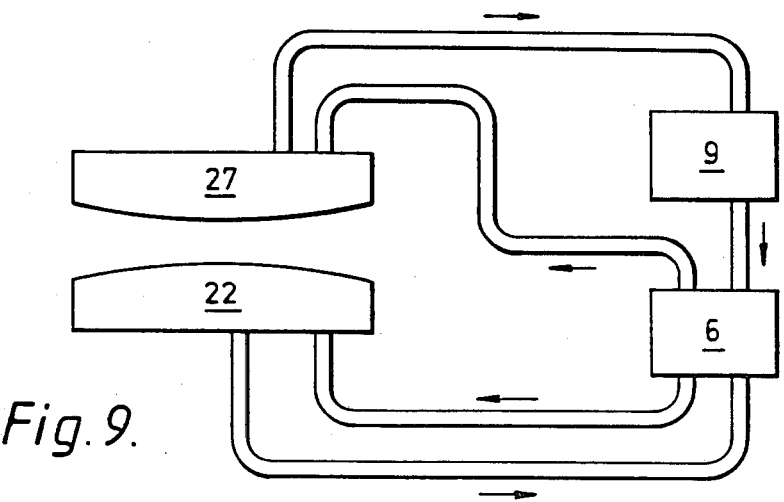
Figure 10:
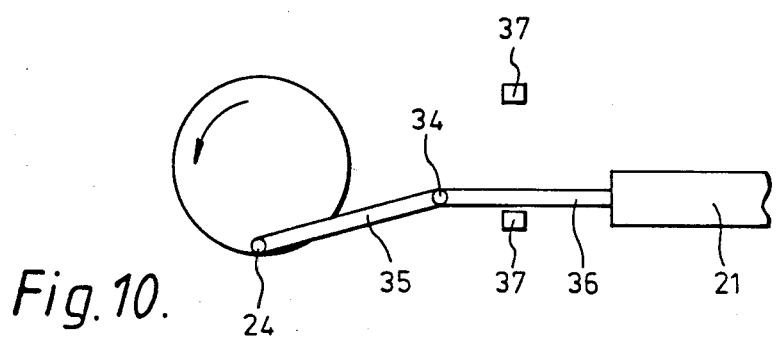
Figure 11:
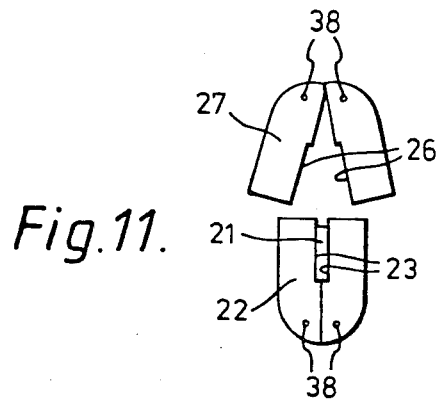

The invention and its specific features will be described in more detail in the following with reference to the attached drawings, wherein FIG. 1 shows an operational diagram of a thermal power machine based on the deformation of a memory alloy, FIG. 2 shows the use of a thermal power machine in itself known in the equipment in accordance with the invention, FIG. 3 is a schematical presentation of the use of an equipment in accordance with the invention as a power machine for a vessel, FIG. 4 is an axonometric view of a particular embodiment in accordance with the invention of a memory-alloy thermal power machine, FIG. 5 is a cross-sectional view of the equipment shown in FIG. 4, FIG. 6 is an axonometric view of a second particular embodiment of a memory-alloy thermal power machine, FIG. 6a is a sectional view of the Nitinol wire used in the apparatus shown in FIG. 6, FIG. 7 is a sectional view of the apparatus shown in FIG. 6, FIG. 7a shows a detail of FIG. 7, FIG. 8 is a schematical presentation of the connecting of the apparatus shown in FIG. 6 with a heat pump, FIG. 9 shows an alternative wiring diagram for the connecting of the apparatus shown in FIG. 6 with a heat pump, FIG. 10 shows a detail of an additional improvement of the apparatus shown in FIG. 6, and FIG. 11 shows the heat exchanger faces of the apparatus shown in FIG. 9, as viewed in the direction of the Nitinol strip.

Like for all thermal power machines, an operational diagram can also be derived for a machine based on the deformation of a memory alloy. Now, it is, however, purposeful to replace the pressure-volume system of coordinates by a stress-elongation system of coordinates. Such an operational diagram is shown in FIG. 1, wherein the x-axis illustrates the elongation (or compression) of the material and the y-axis illustrates its stress. The principle of operation shown in FIG. 1 will be described in the following.

Step 1: The material is deformed at a temperature lower than the transition temperature.

Step 2: The temperature of the material rises and reaches the transition temperature.

Step 3: The deformation of the material is returned to the original form.

Step 4: The temperature of the material is lowered to a level below the transition temperature. Hereupon, step 1 takes place again.

In view of the efficiency of the operation of the machine, the important steps are step 3, wherein the machine performs the mechanical work, as well as step 2, wherein the machine receives the quantity of heat required by the change in phase.

The following is known about the operation of the machine:

1. For a machine operating by means of the loop principle, an efficiency of 7±2 per cent has been obtained within the range of 25° to 60° experimentally.
2. The machine is not a Carnot machine. By means of calculations, it can be established that the efficiency of the machine is better than the efficiency of the Carnot process of circulation.
3. The quantity of heat required for the change in phase is 4150 joules per mole.
4. The other necessary physical properties are known sufficiently accurately so that it has been possible to perform the calculations of the order of magnitude.

FIG. 2 shows an equipment in accordance with the present invention, in which a thermal power machine operating by means of the loop principle, in accordance with the U.S. Pat. No. 4,275,561, is utilized. The thermal power machine is provided with two wheels 2 and 3 fitted side by side, around which one or several parallel Nitinol loops 4 are fitted. The smaller wheel is placed in a medium tank 5 covered by a layer of thermal insulation, the medium, e.g. water, in the said tank 5 being heated by means of a heat pump 6. The heat pump is coupled by means of an appropriate transmission (not shown in the drawing) with the shaft 7 of the larger wheel 2 in the thermal power machine 1. Moreover, an auxiliary motor is connected with the heat pump, which motor may be either a combustion engine or an electric motor (not shown in the drawing).

When the heat pump 6 is started by means of an auxiliary motor, the pump transfers heat from the medium surrounding the pump into the medium in the tank 5. Heat is conducted from the medium in the tank 5 to the wheel 3 of the thermal power machine 1 and to the part of the Nitinol loop 4 surrounding the wheel 3. When the temperature of the Nitinol loop reaches its transition temperature, e.g. 50° C. it tends to become straight, whereat the wheel 3 starts revolving. The movement is transmitted further to the wheel 2, from whose shaft 7 the power is taken off. Part of the power obtained from the shaft 7 is used for driving the heat pump 6, but all of the output power is not needed for this purpose. The excess of the power may be used for any desired purpose.

Instead of an auxiliary motor, the starting may also be performed by means of an auxiliary heater, operating, e.g., by means of electricity or fuel. In such a case, the medium in the tank 5 is first heated to the transition temperature by means of the auxiliary heater, which can be turned off thereinafter as the machine one would then receive its required energy from the medium surrounding the heat pump.

FIG. 3 shows an embodiment for the utilization of the mechanical energy in this way produced. The thermal power machine 1 and the heat pump 6 are fitted on a boat 8. The heat pump transfers heat from the surrounding water 9 through a pipe system 10 into the water tank associated with the thermal power machine, keeping the temperature of the water contained therein, e.g., at about 50° C. Some of the energy generated by the thermal power machine is distributed for the drive of the heat pump and some of it for driving the propeller 11 of the boat.

FIGS. 4 and 5 show an alternative embodiment for the thermal power machine 1 operating by means of the loop principle shown in FIG. 2. This embodiment comprises a medium tank 5 between whose side walls several spring-like Nitinol strips bent to an arc form are attached by means of compression springs 15. Every other strip is bent downwards and every other upwards. To the middle of each strip, a connecting rod 13 is attached whose opposite end is attached rotably to a crankshaft 14, alternatingly to its opposite crank parts.

When the temperature in the tank 5 rises to the transition temperature of the Nitinol strips, the downwardly bent strips 12, at their transition temperature, tend to be straightened to the position that was given them in the heat treatment. Thereby, the connecting rods 13 start rotating the crankshaft 14. When the strips become straight, they rise out of the medium. At that time, no more thermal energy is transferred to them. When they cool down, they again become flexible, and the connecting rod 14 causes them to be bent upwards this time. At the same time, the strips that were originally bent upwards, have been forced to be bent downwards, and they come into contact with the warm medium. Thereinafter they again convert some of the thermal energy contained in the medium to kinetic energy.

The transfer of heat to the Nitinol springs in the apparatus shown in FIGS. 4 and 5 can take place either out of a liquid of low surface tension or out of a heating contact face or as any other energy impulse, e.g. by means of electricity, heat radiation, or laser. In the springs, it is possible to make use of the resonance phenomenon.

In apparatuses in accordance with the invention, constructions of low weight are obtained, and possible materials are, e.g., nylon, fibreglass, etc. The temperature of operation of the apparatus may be, e.g., 40° C. Machines can be built in view of making them best suitable for certain temperature circumstances to be determined separately.

The medium from which, according to the invention, energy is transferred by means of a heat pump may be, e.g., soil, water or air.

In the embodiment shown in FIGS. 6 to 8, Nitinol wires 21 of flat cross-section have been fixed by means of articulated joints between two crankshafts 24 placed side by side symmetrically to each other. At temperatures below their transition temperature, the Nitinol wires are readily extensible, but when the temperature rises to a certain value, they shrink back to their original length.

In the apparatus, there are two chambers 22 and 27 between the crankshafts, placed one above the other. The chambers 22 and 27 are provided with metallic heat exchange faces 23 and 26 facing each other, the distance between the said faces being equal to, or smaller than, the diameter of the path of movement of the crankshafts 24. FIG. 7a is a more detailed view of the construction of the lower heat exchanger face, as a section in the longitudinal vertical plane. It is provided with channels 32 placed side by side for the pipe system of the heat pump. Between the channels 32, in the top face, there are grooves 33 for the Nitinol wires 21. The construction of the upper heat exchanger face 26 is similar, except that the wire grooves 33 are placed at the bottom face. Most appropriately, the heat exchanger faces 23 and 26 are convex towards each other in such a way that, in the middle portion, the distance between them is shorter than the diameter of the crankshafts.

Between the heat exchanger faces 23 and 26, there is an insulation layer 28 in which there are vertical grooves parallel to the grooves 33. Most appropriately, the insulation layer 28 extends to all sides of the chamber 27. The apparatus is enclosed in a steel box 30, out of which the medium has been removed as completely as possible close to the vacuum.

The heat pump 6 is connected between the pipe systems 32 in the heat exchanger faces 23 and 26 so that it transfers heat from the upper heat exchanger face 26 either to the environment or to the lower heat exchanger face 23.

The medium present in the lower chamber 22 is primarily heated from a suitable outside source of heat. It may be heated by means of an external source of heat 34 or, e.g., waste heat from a nuclear power plant (water of about +50° C.) may be passed into it. One alternative is that the heat pump 6 transfers heat from an outside medium, e.g., from +4° C. water surrounding it, to the lower heat exchanger face 23.

When the lower heat exchanger face 23 is heated, the Nitinol wires in contact with it are heated to their transition temperature. On reaching their transition temperature, the Nitinol wires shrink and make the crankshaft 24 cranks at the lowest position, to which the wires 21 are attached, pull themselves towards each other, whereat the wires 21 rise apart from the face 23 and start cooling down. At the same time, the Nitinol wires that are attached to the crankshaft 24 cranks in the upper position and in contact with the upper cooling face 26 are extended as the crankshafts revolve in opposite directions. The movement goes on further so that the wires that were, at the initial position, in contact with the heating face 23 come into contact with the cooling face 26 and are at that stage cooled efficiently. Thereinafter, the same movement is repeated after the wires have exchanged their positions. After the apparatus has been started, the crankshafts revolve constantly symmetrically in opposite directions and the Nitinol wires are alternatingly shrunk when reaching contact with the face 23 and extended as being extended by the crankshafts 24.

The output powers $W_1$ and $W_2$ of the shafts 24 can be combined by means of a common loading shaft (not shown in the figures). Part ($W_3$) of this power can be used for driving the heat pump, whereat the net power $W_4$ is obtained for any other, desired purpose.

If necessary, the position of the crankshafts 24 may be adjusted by shifting the shafts in the directions x and y denoted in FIG. 7. The apparatus, of course, also operates so that the lower face is the cooling face and the upper face the heating face. In such a case, the crankshafts revolve in the opposite direction. Of course, it is also possible to place the entire apparatus so that the wires 21 are not in the horizontal direction.

According to the invention, it is preferable to use a minimal difference in temperature between the faces 23 and 26. In such a case, the loss of heat is at the minimum and, correspondingly, the efficiency of the Carnot pump used for heating the face 23 and for cooling the face 26 is at the maximum.

It is also possible to use several thermal power machines as connected in series so that each machine operates at a slightly lower transition temperature relative the preceding machine. In such a case it is possible to make use of very little differences in temperature between adjoining temperature ranges. Depending on the circumstances, it is also possible to utilize just some smaller portion out of such a series.

The output P of the thermal power machine described in FIGS. 6 to 8 can be calculated theoretically. When the following values are used:

$l_o$ (rest length of Nitinol wire): 5,000 mm
$r$ (radius of Nitinol wire): 1 mm
$R$ (radius of crankshaft): 25 mm
$n$ (speed of rotation of crankshaft): 300 rpm
$z$ (number of Nitinol wires): 100
$\Delta K$ (internal diff. in temp. of machine): 1° to 3° K.,
as the output is obtained P 150 kW (without heat pump). Max. torque per wire is then 150 Nm.

FIG. 9 shows schematically how the liquid cooled in the evaporator of the heat pump 6 is circulated first via the heat exchanger 27 provided with a cooling face, whereat the temperature of the cooling face is lowered efficiently. It is only thereinafter that the liquid is passed through the medium 9 used as the source of heat, where its temperature rises to the same level with the temperature of the medium 9. Thereupon the liquid circulates back to the evaporator of the heat pump, where it delivers heat.

The liquid passing through the heat exchanger 22 provided with a heating face is circulated through the condenser of the heat pump 6, where it is heated and thereby keeps the temperature of the heating face sufficiently high.

FIGS. 10 and 11 show an additional improvement for the apparatus shown in FIGS. 6 to 8. In the apparatus, flat, band-shaped Nitinol strips 21 are used, whose width is, e.g., about 10 mm and thickness, e.g., about 0.25 mm. The length of a strip may be, e.g., 100 cm. Rods provided with articulated joints are attached to the ends of the strips. The strips are fitted so that the long side of their cross section is placed vertically. FIG. 10 shows one end of a Nitinol band as well as the articulated rod related to it and the crankshaft 24. The articulated rod consists of two parts 35 and 36 connected to each other by means of an articulated joint 34. One end of the rod 35 is attached pivotably to the crankshaft 24 and the other end of the rod 36 is attached permanently to the Nitinol strip 21. Above and underneath the rod 36, there are stops 37 whose distance from each other is shorter than the diameter of the path of movement of the crankshaft 24.

FIG. 11 shows the heat exchangers 22 and 27 used in the embodiment of FIG. 10. Each heat exchanger consists of two parts, which are attached to the frame of the heat exchanger by means of hinges 38. In the closed position of the heat exchanger, a slot remains between the opposite heat exchanger faces of the parts the width of which slot corresponds to the thickness of the Nitinol strip 21. The heat exchangers 22 and 27 extend over the entire length of the Nitinol strip. The pipe systems of the heat pump run inside the jaws of the heat exchangers. The jaws of the heat exchangers are normally kept in the opened position, e.g., by means of springs (not shown in the drawing).

When the Nitinol strip 21 comes from the top downwards along with the crankshaft 24, the rods 36 at its ends contact the lower stop members 37. This has the effect that the relay (not shown in the drawing) connected to the stop member makes the jaws of the heat exchanger 22 pull themselves against the spring force towards each other, into tight contact against the Nitinol strip 21 at both sides of the strip. Thereby the strip is rapidly heated to its transition temperature and is shortened intensively. The cranks of the crankshafts 24 revolve in opposite directions beyond their lowermost points until the rod 36 starts rising apart from the stop member 37. The articulated joint 34 makes it possible that, during this period of time, the position of the Nitinol strip has not been changed in the vertical direction. At the same time as the rod 36 moves apart from the stop member 37, the relay releases the jaws of the heat exchanger apart from each other, and the strip 21 can rise.

When the rod 36 rises further, it reaches contact with the upper stop 37, which correspondingly makes the jaws of the upper heat exchanger 27 close themselves around the strip 21. Thereby the cooling faces 26 reach tight contact with the strip 21 and cool it efficiently and rapidly. After that, the strip is again extended as pulled by the crankshaft 24. Thereinafter the sequence of movements is repeated again.

Like in the embodiment of FIGS. 6 to 8, in the embodiment of FIGS. 10 and 11 several parallel strips 21 are also used. In such a case, there are heat exchangers 22 and 27 of its own for each strip.

The stop members 37 may be, e.g., fork-shaped, whereby the rod 36 ends up between the two vertical pins of the fork and remains reliably in its position.

Alternatively, the stop members 37 and the articulated joints 34 may also be omitted. In such a case, in stead of stop members 37, limit switches are used which activate the relays closing the jaws of the heat exchangers. In such a case, the heat exchangers are attached resiliently, e.g., by means of compression springs fitted at the hinge side, so that the heat exchangers move along with the strips 21 in their closed position.

In stead of hinged jaws of heat exchangers, it is also possible to use parts that move towards each other and away from each other so that their heat exchanger faces remain constantly parallel to each other. Either one of the jaws or both of the jaws may be mobile. The length of the movement may be very short; it is enough that the strip 21 can be detached from between the jaws.

In stead of a flat Nitinol strip, a wire of circular section may also be used, whereat the jaws of the heat exchangers have recesses corresponding to the section of the wire. However, in view of efficient transfer of heat, a flat band is preferable. In view of efficient operation of the apparatus, it is also important that the contact faces of the jaws are as smooth as possible and uniformly heated.

What is claimed is:

1. The combination of a thermal power machine and a heat pump, the thermal power machine including a metal member having physical properties which change dependent on temperature of said metal member, the change of the physical properties providing a driving power output from the thermal power machine, the heat pump connected to the thermal power machine so that said metal member is heated by a heat containing medium external of said heat pump and transferred by said heat pump to said metal member, the thermal power machine driving the heat pump by means of mechanical energy generated by the thermal power machine, comprising a pair of metallic heat exchange faces provided in the thermal power machine, one of said pair of faces heated by the heat transferred from the heat pump, the other of said pair of faces having a lower temperature than said one of said pair of faces, said metal member positioned between said pair of faces so as to alternatingly contact said pair of faces, the metal member being provided in a predetermined length which expands below a predetermined temperature and contracts to the predetermined length upon an increase in the temperature.

2. The combination of a thermal power machine and a heat pump as set forth in claim 1, wherein the heat pump heats said one of said pair of faces and cools the other of said pair of faces.

3. The combination of a thermal power machine and a heat pump as set forth in claim 2, wherein the other of said pair of faces is cooled by the heat pump through a medium, said medium subsequently heated by said heat containing external meium prior to recirulation of said medium into a heating section of the heat pump, said one of said pair of faces being heated by said heating section of the heat pump.

* * * * *